Figure 1:
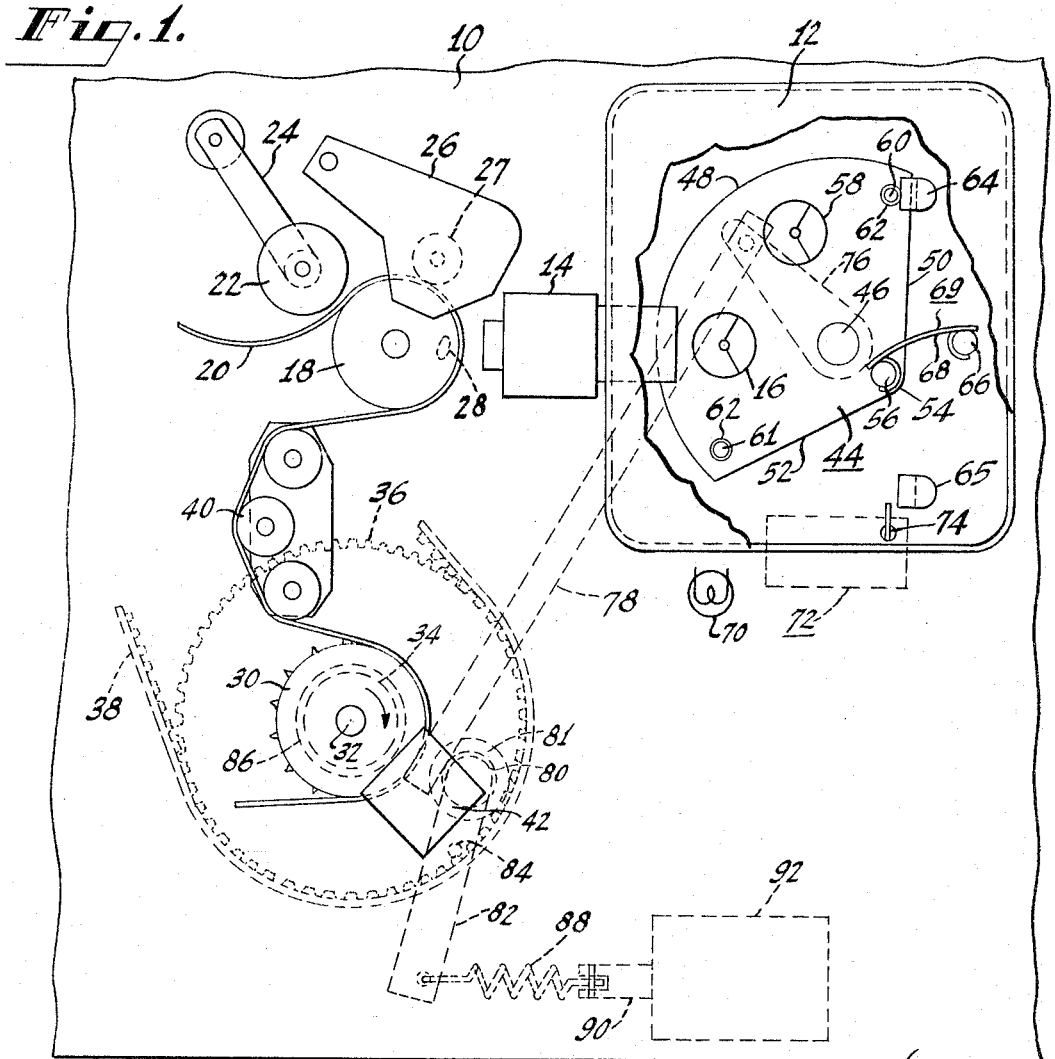

Aug. 30, 1966  B. F. FLODEN  3,269,795

AUTOMATIC EXCITER LAMP CHANGER

Filed May 11, 1964

INVENTOR.
BJORN F. FLODEN
BY Morrish Rakkin
Attorney

United States Patent Office 3,269,795
Patented August 30, 1966

3,269,795
AUTOMATIC EXCITER LAMP CHANGER
Bjorn F. Floden, Palmyra, N.J., assignor to Radio Corporation of America, a corporation of Delaware
Filed May 11, 1964, Ser. No. 366,436
8 Claims. (Cl. 352—198)

This invention relates to a device for automatically turning on a second or stand-by light source and for moving it to an operative position in response to the burning out of a first or primary light source. The invention is particularly useful in a talking moving picture projector for changing a burned out exciter lamp.

In the operation of a talking moving picture projector, a light beam produced by an exciter lamp is projected through the sound track of the film and onto a light sensitive cell after the film has left the intermittent film driving mechanism comprising part of the projector. If the exciter lamp fails, the sound is interrupted until an operator can change the lamp. Interruption mars the entertainment or commercial value of the film. The lamp should therefore be replaced as quickly as possible. However, quick replacement of the lamp should not jar the spare lamp to the extent that the filament thereof is damaged. Further, if a stand-by lamp is used to replace the primary lamp, a signal should be provided to indicate to the operator that the primary lamp has burned out and that the spare lamp is in use.

It is an object of this invention to provide an improved automatic means for changing the exciter lamp of a film projecting device upon failure of the exciter lamp.

It is a further object of this invention to provide a quick operating automatic lamp changer that minimizes jarring of the lamp.

It is a still further object of the present invention to provide an improved, quick operating automatic lamp changer that reduces jarring of the lamp and that includes a signal to indicate that the lamp has been changed.

In accordance with the invention, a pair of lamps are mounted on a rotatable plate. An over-center snap or toggle spring means is provided which resiliently holds the plate in either one of two positions. In the first of these positions, a primary exciter lamp is in a position to supply light through a lens system and through the sound track of a film; and in the second of these positions, a normally unenergized, stand-by lamp is in position to illuminate the sound track. Means driven by the main projector motor is provided for rotating the plate to its second position upon failure of the primary exciter lamp. The plate rotating means is kept energized well beyond the dead center of the toggle spring and substantially to the end of rotation of the plate to control the speed of the movement. Thereby acceleration by the spring to high speed and the consequent jar of sudden stopping of the plate at the end of its travel is minimized. Soft (rubber) stop means may also be provided to further cushion the stopping of the plate.

The standby lamp is energized only when moved into working position. Means may also be provided for energizing a warning signal when the stand-by lamp is moved into operation. Upon observing the warning signal, the operator may, at his first opportunity, replace the faulty lamp and he may rotate the plate manually back to its original position whereby the replacement lamp is put into service and the warning signal and the stand-by lamp are both extinguished. The automatic exciter lamp changing device is thus reset for further operation.

Figure 2:
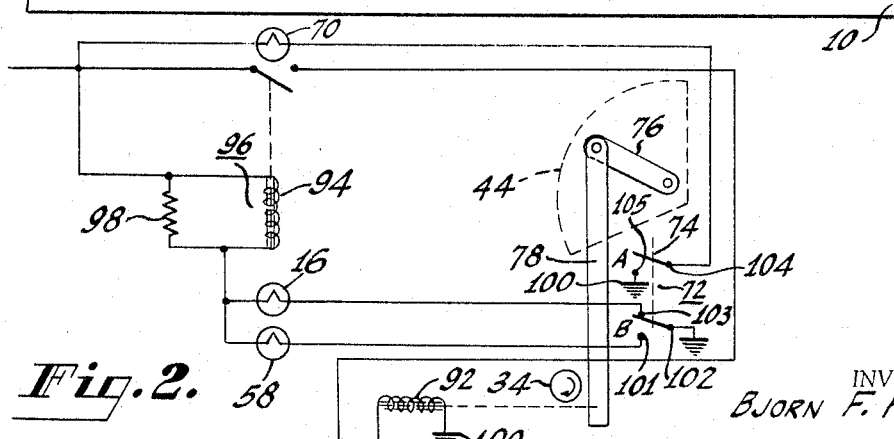

The novel features of this invention, both as to its organization and method of operation, as well as additional objects and advantages thereof, will be understood more fully from the following description, when read in conjunction with the accompanying drawings in which:

FIGURE 1 is a front elevational view of one form of lamp changer according to this invention; and
FIGURE 2 is a wiring diagram suitable for use in connection with the device of FIG. 1.

As shown in FIG. 1, a supporting panel 10 is provided on which a light-tight cover 12 is mounted. A lens system 14 extends through the cover 12. One end of the lens system 14 is in close proximity to an exciter lamp in operating position. In the position shown, a first or primary filamentary exciter lamp 16 is in operating position. The other end of the lens system 14 is in close proximity to the inner edge of a sound drum 18 which is rotatably mounted on the support 10. A film 20 having a photographic sound track thereon runs over the sound drum 18 in known manner. Film loop 20 is not engaged with roller 22 during normal operation. A bracket 26, pivotally mounted on the panel 10, carries a roller 27 which presses the film against the sound drum 18 during operation of the projector. Normally (i.e., when the projector is at rest), the bracket is biased to a position somewhat counterclockwise to that shown in FIG. 1. In this position, the roller 27 is clear of the film 20. However, when the projector is started, a solenoid (not shown) is energized to move the bracket 26 into the position shown in FIG. 1 and thus cause the roller 27 to engage the film and hold it firmly against the sound drum.

The inner edge portion of the film 20 (as viewed in FIG. 1) which has the sound track thereon, extends beyond or overhangs the sound drum 18 and is located in the path of the light beam from the lens system 14. A photo sensitive cell 28 adjacent the sound drum 18 and on the other side of the film 20 from the lens system 14 receives light from the exciter lamp 16, as modulated by the sound track, and translates the modulated light into electrical signals in known manner.

A film drive sprocket 30 is fixed in front of panel 10 to a shaft 32 which is rotatably mounted on the panel 10 and extends therethrough. A drive roller 34 and a toothed timing belt pulley 36 are fixed to the shaft 32 behind the panel 10, as viewed in FIG. 1. A timing belt 38, driven by a main drive motor (not shown) of the projector, causes rotation of the shaft 32 and the parts mounted thereon in a clockwise direction. A film motion damper 40 is mounted on the panel 10 in the film path between the sound drum 18 and the film sprocket 30, and a film shoe 42, also mounted on the panel 10 for swinging movement relative to the sprocket 30, cooperates with the sprocket 30 to hold the film 20 thereon. The film 20, after it leaves the intermittent motion device (not shown) of the film projector, extends in a loose loop to the sound drum, then around the sound drum 18, next in contact with the film motion damper 40, then between the sprocket 30 and the film shoe 42, and thence to a take-up reel (not shown). The purpose of the drive roller 34 mounted on the shaft 32 is explained hereinafter.

The lamp changer includes the plate 44 pivotally mounted behind the cover 12 on a rotatable axle 46 which extends through the panel 10. The plate 44 is sectoral in shape, one edge 48 thereof being circular and centered on the axle 46. The other two edges 50 and 52 are straight lines extending at an obtuse angle to each other, the tip 54 corresponding substantially to the intersection of the straight edges 50 and 52 and being disposed beyond the center of the plate in a direction away from the circular edge 48 thereof. An over-center snap or toggle anchor pin 56 extends laterally from the plate 44 between the tip 54 and the axle 46. The primary exciter lamp 16 and an auxiliary, stand-by exciter lamp 58 are located by means of suitable sockets in the plate 44 at different angular positions near the curved edge 48 of the plate. Stop pins 60 and 61 extend from the plate 44 adjacent the respective junctions of the curved edge 48 of the plate 44 with the straight edges 50 and 52 thereof. A resilient O-ring 62 surrounds each stop pin 60, 61. A pair of cooperating stops 64, 65 are mounted on the panel 10 in the respective paths of the stop pins 60, 61. A second over-center toggle anchor pin 66 is mounted on the panel 10 between the stops 64, 65. A bow-shaped toggle spring 68 extends between the anchor pins 56 and 66, thus completing the over-center snap or toggle means 69. When plate 44 is pivoted from one of its extreme positions to the other, the distance between toggle pins 56 and 66 changes from a maximum value at one extreme position through a minimum value midway between these positions and back to the maximum value when the other extreme position is reached. The bow-shaped spring 68 flexes as the distance changes, and tends to keep the plate 44 firmly against the stop means 64 or 65 in either of the extreme positions of the plate 44.

The rotatable plate 44 has two positions of rest. In the position of plate 44 shown in FIG. 1 the primary lamp 16 is held with its filament lined up on the axis of the lens system 14. In the counter-clockwise position of plate 44, the filament of the stand-by lamp 58 is lined up on the axis of lens system 14. A signal lamp 70 is mounted where it will be visible to the operator.

A microswitch 72, having two sets of contacts A and B (see FIG. 2), is mounted on the back of panel 10. The microswitch contacts are jointly, mechanically controlled by a lever 74 extending from the microswitch 72 into the path of plate 44, for a purpose to be described.

Means are provided to rotate the lamp support plate 44 from its first position to its second position. This means includes a lever 76, one end of which is fixed to the axle 46 at the back of the panel 10, as viewed in FIG. 1. A link, which may be a round rod 78, is pivotally mounted on the other end of the lever 76. The rod 78 extends downward and to the left from lever 76, as viewed in FIG. 1, the lower end of the rod 78 resting on an idler roller 80 which is rotatably mounted on an end of a lever 82 which is itself pivoted on a pivot pin 84 on the back of the panel 10. Flanges 81 are provided on the idler roller 80 to guide the rod 78 therebetween. The other end of the lever 82, beyond the pivot 84, is mechanically coupled, as by a tension spring 88, to the movable element 90 of the solenoid 92 which is mounted on the back of the panel 10.

The roller 34 has two grooves in which two O-rings 86 are located to facilitate frictional engagement of the roller 34 with the rod 78, when the solenoid 92 is energized. The idler 80 normally supports rod 78 in a position where the rod 78 does not touch roller 34. The clockwise rotation of roller 34 will pull rod 78 downwards, which pivots plate 44 counter-clockwise.

Rod 78 is held in good frictional contact with the roller 34 well beyond the dead center of the toggle means 69. The solenoid is deenergized by the edge 52 of plate 44 contacting lever 74 when the plate 44 is close to the stop 65, thereby permitting rod 78 to fall away from roller 34, as will be more fully explained below.

A wiring diagram of a circuitry, suitable for operation of the exciter lamps and the changing mechanism from a sufficient D.C. source of higher voltage than the rating of the exciter lamps, is shown in FIG. 2.

The microswitch 72 is provided with a single pole single throw switch A comprising an armature 104 and a contact 105 and with a single pole double throw switch comprising an armature 102 and contacts 101 and 103. Current is applied through the coil 94 of a relay 96 and a resistor 98 in parallel therewith and in series with the primary lamp 16 through the normally closed armature 102 and contact 103 to ground 100.

A circuit is also provided for applying current through the relay coil 94 and the resistor 98 in parallel to the stand-by lamp 58 and through the normally open microswitch armature 102 and contact 101 to ground. Current is supplied to the signal lamp 70 through the normally open contact 105 and armature 104 to ground. A circuit is also provided for applying current through the contacts of the relay 96 and through the solenoid 92 to ground. The purpose of the resistor is to provide, with the coil 94 of the relay, sufficient current to operate a lamp 16 or 58.

Operation of the above described apparatus is as follows: In the device and circuit in the position as shown in FIGS. 1 and 2, the primary exciter lamp 16 is energized and operative and the relay 96 is energized to keep its contacts open whereby the solenoid 92 is deenergized. The stand-by lamp 58 and the signal lamp 70 are deenergized. When the primary lamp 16 burns out, relay 96 becomes unenergized and its contacts close. Then solenoid 92 is energized and forces rod 78 against the rotating roller 34. The roller 34 pulls rod 78 down in a substantially linear motion thereby rotating plate 44 counterclockwise.

Plate 44 rotates, pulled by rod 78 from its clockwise position shown in FIG. 1, past the middle point of its travel, where the toggle spring 68 starts to provide torque in the direction of rotation, and continues towards its counterclockwise position until a short distance before the end of its travel at the position where the edge 52 contacts the bottom stop 65. Contact of the rod 78 with the roller 34 prevents the spring 68 from speeding up the rotation of the plate 44 beyond that permitted by the speed of rotation of the roller 34. Just before or substantially at the end of its travel, the edge 52 of the plate 44 hits the lever 74 of the microswitch 72, which closes switch portion A to energize the warning lamp 70 and changes the position of the armature 102 of switch portion B to close an energizing circuit for the stand-by lamp 58. The lamp 58 completes a circuit for relay coil 96 whereby its contacts will be opened to deenergize solenoid 92. Then the rod 78 is released from engagement with roller 34, and the spring 68 will complete the small amount (if any) of travel of plate 44 until it contacts stop 65. The stand-by lamp 58 is now lit and in working position, and the warning lamp 70 is lit. The primary lamp 16 must be replaced and plate 44 reset by hand to its clockwise position to prepare the lamp changer to operate upon subsequent burning out of the lamp 16. The long engagement of rod 78 with the roller 34 during the change operation insures against jarring of the lamp filament, which would be caused if plate 44 were free to swing towards the stop 65 by the force supplied by the toggle spring 68.

In spite of this gentle motion of the support plate 44, the change of exciter lamps takes place so fast that there is no noticeable cessation in the sound. Furthermore, no power motor, in addition to the projection main power motor (not shown) is required to operate the above described lamp changer.

When the operator sees that the signal lamp 70 is lit, he waits until such time as there is no sound or until the projector is out of operation. Then, he removes the cover 12, replaces the original lamp 16, and he manually rotates the plate 44 clockwise to its first position, whereupon the switch 72 takes the position shown in FIG. 2. Current flowing through the newly replaced lamp 16 keeps the contacts of the relay 96 open to thereby deenergize the solenoid 92 during resetting of the plate 44 to its first position.

Although only a single form of exciter lamp changer according to the present invention has been described, it will undoubtedly be apparent to those skilled in the art that variations are possible within the spirit of this invention. Hence, it will be understood that the above-de-

What is claimed is:
1. A lamp changer comprising
  (a) a rotatably mounted support plate, said plate being rotatable between two positions,
  (b) means for mounting a pair of lamps on said plate, one of said lamps to be normally energized and so mounted on said plate as to be at an illuminating position when said plate is in the first of said two positions, and the other of said lamps to be normally un-energized and so mounted on said plate as to be at said illuminating position when said plate is at the second of said two positions,
  (c) spring means for resiliently holding said support plate in the first of said two positions,
  (d) power means responsive to the failure of said one lamp at said illuminating position for rotating said plate from said first position towards the other of said two positions, and
  (e) means for applying lighting energy to said other lamp and for uncoupling said power means from said plate in response to rotation of said plate through the greater portion of the angle between its said two positions.

2. A lamp changer comprising
  (a) a rotatably mounted support plate, said plate being rotatable from one to the other of two positions through a dead center position,
  (b) means for mounting a pair of lamps on said plate, one of said lamps to be normally energized and to be so mounted on said plate as to be at an illuminating position when said plate is in the first of said two positions, and the other of said lamps to be normally un-energized and so mounted on said plate as to be at said illuminating position when said plate is at the second of said two positions,
  (c) over-center snap spring means for normally resiliently holding said support plate in the first of said two positions and effective to urge said plate towards and hold it in the second of said two plate positions upon movement of said plate through its said dead center position,
  (d) power means responsive to the failure of said one lamp at said illuminating position for rotating said plate from said first position beyond its said dead center position towards the other of said two positions, and
  (e) means for applying lighting energy to said other lamp and for uncoupling said power means from said plate in response to rotation of said plate beyond its said dead center position from said first position thereof substantially to said second position thereof.

3. In a device for modulating light in accordance with the variations in transparency of a sound track on a film, said device including power means for advancing said film through a light beam, the combination of
  (a) a rotatably mounted support plate,
  (b) means for operationally mounting a pair of lamps on said plate,
  (c) means for applying lamp energizing potential to one of said lamp mounting means, the other of said lamp mounting means being normally un-energized,
  (d) a signal lamp,
  (e) spring means for resiliently holding said support plate in a position whereat a lamp mounted on said one lamp mounting means provides said light beam,
  (f) means responsive to failure of a lamp mounted on said one lamp mounting means to couple said power means to said plate to rotate it towards another position whereat the lamp mounted on the other of said pair of lamp mounting means is in position to provide said light beam, and
  (g) means for applying lamp energizing potential to said other lamp mounting means and to said signal lamp and for uncoupling said power means from said plate when said plate is moved through the greater portion of the angle between said two positions of said plate.

4. In a device for modulating light in accordance with the variations in transparency of a sound track on a film, said device including power means for advancing said film through a light beam, the combination of
  (a) a rotatably mounted support plate,
  (b) means for mounting a pair of lamps on said plate,
  (c) means for applying lamp energizing potential to one of said lamp mounting means, the other of said lamp mounting means being normally un-energized,
  (d) a signal lamp,
  (e) over-center snap spring means for resiliently holding said support plate in a position whereat a lamp mounted on said one lamp mounting means provides said light beam,
  (f) means responsive to failure of a lamp mounted on said one lamp mounting means to couple said power means to said plate to rotate it towards another position whereat the lamp mounted in the other of said pair of lamp mounting means is in position to provide said light beam, and
  (g) means for applying lamp energizing potential to said other lamp mounting means and to said signal lamp and for uncoupling said power means from said plate when said plate is rotated well beyond dead center of said over-center snap spring means and substantially through the complete angle towards the other of said two positions of said plate.

5. In apparatus for translating signals from a photographic sound track on a film with the aid of a light beam, said apparatus including power means for advancing the film past the path of said beam, the combination of
  (a) a rotatable plate mounted for movement from one to the other of two positions and vice versa,
  (b) a pair of lamp mounting means carried by said plate at such locations that, when said plate is in said one position, a lamp mounted on the first of said lamp mounting means is in position to provide said light beam, and when said plate is in said other position, the lamp mounted on the second of said pair of lamp mounting means is in position to provide said light beam,
  (c) means for applying lamp energizing potential to said first lamp mounting means when said plate is in said one position and for maintaining said second lamp mounting means un-energized,
  (d) means responsive to extinguishment of a lamp mounted on said first lamp mounting means to couple said plate to said power means to thereby move said plate from its said one position substantially to its said other position and thereby remove said first lamp mounting means from said beam providing position and concurrently move said second lamp mounting means into said beam providing position, and
  (e) means for applying lamp energizing potential to said second lamp mounting means when said plate is in its said other position to thereby render a lamp mounted on said second lamp mounting means effective to provide said light beam.

6. In apparatus for translating signals from a photographic sound track on a film with the aid of a light beam, said apparatus including power means for advancing the film past the path of said beam, the combination of
  (a) a rotatable plate mounted for movement from one to the other of two positions and vice versa,
  (b) a pair of lamp mounting means carried by said plate at such locations that, when said plate is in said one position, a lamp mounted on the first of said lamp mounting means is in position to provide said light beam, and when said plate is in said other position, the lamp mounted on the second of said pair of lamp mounting means is in position to provide said light beam,
(c) over-center snap spring means for holding said plate in either of said two positions,
(d) means for applying lamp energizing potential to said first lamp mounting means when said plate is in said one position and for maintaining said second lamp mounting means un-energized,
(e) means responsive to extinguishment of a lamp on said first lamp mounting means to couple said plate to said power means to thereby move said plate from its said one position beyond dead center of said over-center snap spring means substantially to its said other position and thereby remove said first lamp mounting means from said beam providing position and concurrently move said second lamp mounting means into said beam providing position, and
(f) means for applying lamp energizing potential to said second lamp mounting means when said plate is in its said other position to thereby render a lamp mounted on said second lamp mounting means effective to provide said light beam.

7. In apparatus for translating signals from a photographic sound track on a film with the aid of a light beam, said apparatus including a power driven shaft carrying a sprocket for advancing the film past the path of said beam, the combination of
(a) a rotatable plate mounted for movement from one to the other of two positions, and vice versa,
(b) a pair of lamp mounting means carried by said plate at such locations that, when said plate is in said one position, a lamp mounted on the first of said lamp mounting means is in position to provide said light beam, and when said plate is in said other position, a lamp mounted on the second of said pair of lamp mounting means is in position to provide said light beam,
(c) means for applying lamp energizing potential to said first lamp mounting means when said plate is in said one position and for maintaining said second lamp mounting means un-energized,
(d) means responsive to extinguishment of a lamp mounted on said first lamp mounting means for coupling said plate to said shaft to thereby effect movement of said plate from its said one position substantially to its said other position whereby to remove said first lamp mounting means from said beam providing position and concurrently move said second lamp mounting means substantially into said beam providing position, and
(e) means for applying lamp energizing potential to said second lamp mounting means when said plate is in its said other position to thereby render a lamp mounted on said second lamp mounting means effective to provide said light beam.

8. In apparatus for translating signals from a photographic sound track on a film with the aid of a light beam, said apparatus including a power driven shaft carrying a sprocket for advancing the film past the path of said beam, the combination of
(a) a rotatable plate mounted for movement from one to the other of two positions, and vice versa,
(b) a pair of lamp mounting means carried by said plate at such locations that, when said plate is in said one position, a lamp mounted on a first of said lamp mounting means is in position to provide said light beam, and when said plate is in said other position, a lamp mounted on the second of said pair of lamp mounting means is in position to provide said light beam,
(c) means for applying lamp energizing potential to said first lamp mounting means when said plate is in said one position and for maintaining said second lamp mounting means un-energized,
(d) means including a link pivotally connected to said plate and normally out of driving engagement with said shaft, and a pressure roller operable in response to extinguishment of a lamp mounted on the said first lamp mounting means to bring said link into driving relation with said shaft to thereby couple said plate to said shaft for moving said plate from its said one position towards its said other position and thereby effect removal of said first lamp mounting means from said beam providing position and concurrent movement of said second lamp mounting means towards said beam providing position, and
(e) means for applying lamp energizing potential to said second lamp mounting means when said plate is in its said other position to thereby render a lamp mounted on said second lamp mounting means effective to provide said light beam.

References Cited by the Examiner
UNITED STATES PATENTS

| | | | |
|---|---|---|---|
| 2,590,513 | 3/1952 | Crossleg et al. | 240—37.1 |
| 2,905,861 | 9/1959 | Ganzenhuber | 240—37.1 |

NORTON ANSHER, *Primary Examiner.*

CHARLES R. RHODES, *Assistant Examiner.*